March 25, 1930.                E. F. AHEARN                1,752,137
                            COMPARTMENT PAN
                            Filed Aug. 3, 1927
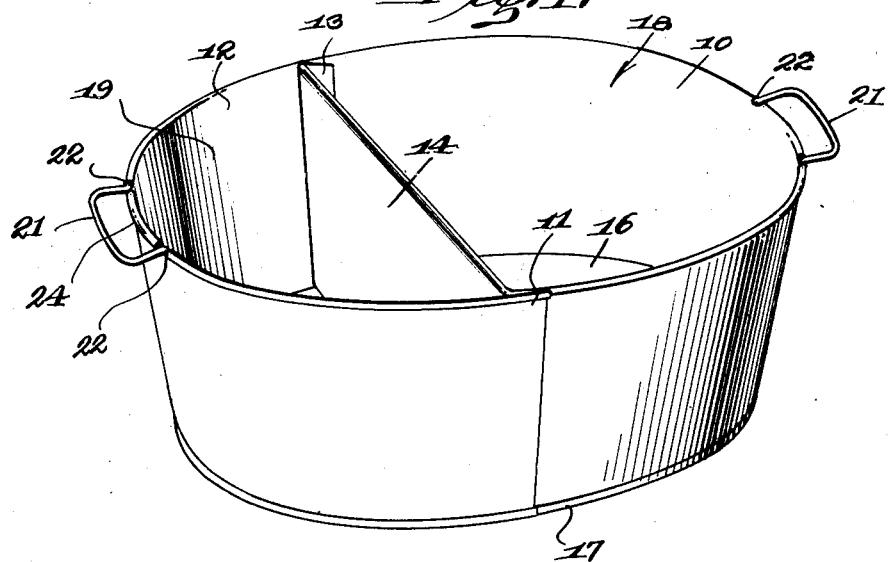
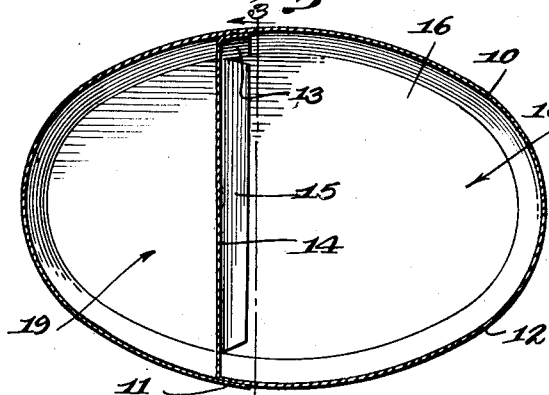
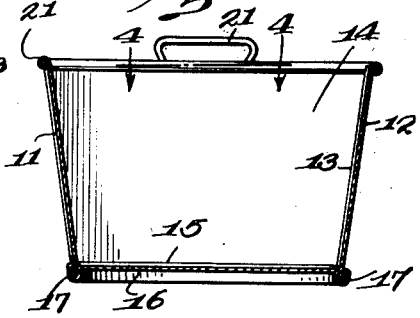
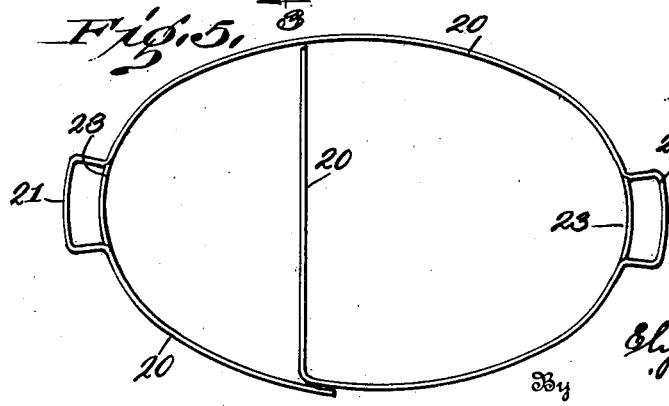
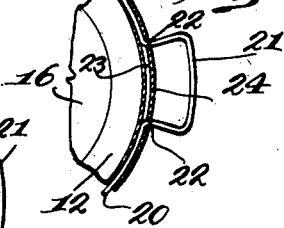
Inventor
Elizabeth F. Ahearn
By
Attorney Patented Mar. 25, 1930

1,752,137

UNITED STATES PATENT OFFICE

ELIZABETH F. AHEARN, OF DETROIT, MICHIGAN

COMPARTMENT PAN

Application filed August 3, 1927. Serial No. 210,307.

My invention relates to a compartment receptacle of that particular type adapted for use in a kitchen as a dish pan, and aims to provide an improved device of this character in which the partition is formed integral with the side walls as a continuation thereof and connected thereto in a particular manner to provide a rigid structure in which one of the compartments may be used to contain washing water and the other rinsing water.

Another object of the invention is the provision of a reinforcing wire within the upper edge of the side walls and partition of the pan held in place by rolling said upper edges over the wire so that it will not only reinforce said side walls and partition but also provide loops at opposite sides of the pan in the form of handles.

It is also an object of the invention to provide a device of the above indicated character which is simple and substantial in construction, can be manufactured economically, and will be thoroughly efficient and practical in use.

With the foregoing and other objects in view, which will be apparent as the description proceeds, the invention resides in the construction and arrangement of parts, as hereinafter described and specifically set forth in the claim.

The invention is illustrated in the accompanying drawings, wherein:

Figure 1 is a perspective view of my improved pan,

Figure 2 is a horizontal section through the pan,

Figure 3 is a cross section taken on line 3—3 of Figure 2,

Figure 4 is a fragmentary horizontal section taken on line 4—4 of Figure 3, and

Figure 5 is a detail view of the reinforcing and handle forming wire.

In carrying out the invention the side walls and partition of the pan are formed from a single sheet of material 10 having one end thereof attached to the body by an overlapping seam, indicated by the numeral 11, to form the side walls 12, while the other end of the material is extended across the pan from this point and is attached to the opposite side of the pan by means of the terminal lateral flange 13 secured to said side wall in any suitable manner, as by soldering, the aforesaid extension of the sheet of material forming the partition 14 and having an outturned flange 15 at the lower edge thereof by which it is attached to the bottom 16. The bottom is attached at its edges to the side walls in the ordinary manner by interlocking the material together, as indicated by the numeral 17. By forming the side walls and the partition of the same piece of material bent upon itself and connected as hereinbefore described it can be seen that but one seam leads from the pan and that the larger compartment, indicated by the numeral 18, is absolutely sealed at the sides thereof whereby in case there should be a leak from this compartment at the point where the partition is attached to the side wall opposite the aforementioned seam the liquid would not escape from the pan but merely pass from one compartment into the other. The same would hold true relative to the point where the lower edge of the partition 14 is attached to the bottom 16 of the pan.

At the upper edges of the sheet of material forming the side walls 12 and partition 14 is a reinforcing wire 20 attached by rolling the material over said wire, as indicated by the numeral 21. It can thus be seen that the length of wire 20 follows the configuration of the upper edge of the pan including the sides and partition, and that the ends thereof terminate at opposite sides of the pan or with the material forming said sides and partition, said wire being bent outwardly at opposite ends of the pan, as at 21, to provide opposite handles and of course the handle portions are not enclosed within the upper edges of the sheet of material forming the side walls but extend outwardly therefrom at which point the sheet of material is notched, as at 22, for permitting the handles to extend outwardly. In order that the entire upper edge of the pan will be reinforced by wire two short pieces of wire 23 are located in the rolled edges of the sides of the pan between the loop portions forming the handles, the aforesaid rolled edges being indicated by the numeral 24. It can thus be seen that the entire upper edge of the pan is reinforced and that the handles are integral parts of the same wire which extends around the pan.

The pan is especially designed for use as a dish pan to provide two compartments of different sizes, the larger compartment 18 containing water for washing dishes, while the smaller compartment 19 contains water for rinsing them, thus eliminating the necessity of using separate receptacles for the two purposes and thereby providing a dish pan which will not require near the amount of space that two separate receptacles would require. Consequently the pan may be easily placed in a sink that may not accommodate two ordinary dish pans.

From the foregoing description, in connection with the accompanying drawings it will be obvious that I provide a particular construction of dish pan of the type having a partition so that it will serve a dual purpose, and that the pan is constructed so that it will be efficient and practical for the purpose intended, as well as strong and durable in use by reason of the particular manner in which the single sheet of material forming the body and partition is connected at its ends to the side walls and the lower edge of the partition connected to the bottom of the pan.

Having thus described my invention, what I claim as new is:

A dish pan the body portion of which is formed from a single sheet of material shaped in circular form and extended from one side of said body portion to the other to provide a transverse partition therein, a wire at the upper edge of the pan and partition and over which the material of the pan and partition is rolled to reinforce the body and partition of the pan, portions of the bead being cut away at opposite ends of the pan and the wire at these points bent outwardly to form handles, and a short piece of wire between the outwardly bent portion of each handle and over which the material is rolled.

ELIZABETH F. AHEARN.